(12) United States Patent  (10) Patent No.:  US 7,950,426 B2
Byrne  (45) Date of Patent:  May 31, 2011

(54) TREAD BLOCKS HAVING REDUCED EDGE STIFFNESS

(75) Inventor: Francis J. Byrne, Franklin, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 956 days.

(21) Appl. No.: 11/760,015

(22) Filed: Jun. 8, 2007

(65) Prior Publication Data

US 2008/0302457 A1  Dec. 11, 2008

(51) Int. Cl.
*B60C 11/117* (2006.01)
*B60C 11/12* (2006.01)

(52) U.S. Cl. ......... 152/209.17; 152/209.18; 152/209.21; 152/DIG. 3

(58) Field of Classification Search ............. 152/209.17, 152/209.18, 209.21, DIG. 3
See application file for complete search history.

(56) References Cited

U.S. PATENT DOCUMENTS

| | | | |
|---|---|---|---|
| 3,799,231 A | 3/1974 | Boileau | |
| 4,479,525 A | 10/1984 | Graas | |
| 4,934,424 A | 6/1990 | Kojima | |
| 5,095,963 A | 3/1992 | Maitre | |
| 5,147,478 A | 9/1992 | Nock et al. | |
| 5,200,008 A | 4/1993 | Enterline et al. | |
| 5,394,916 A | 3/1995 | Williams | |
| 5,538,060 A | 7/1996 | van der Meer et al. | |
| 5,582,661 A | 12/1996 | Winter | |
| 5,591,280 A * | 1/1997 | Asano | 152/DIG. 3 |
| 5,622,575 A | 4/1997 | Meyer-Adlung et al. | |
| 5,660,651 A | 8/1997 | Diensthuber | |
| 5,814,169 A | 9/1998 | Yamaguchi et al. | |
| 5,851,322 A * | 12/1998 | Hayashi | 152/DIG. 3 |
| 5,871,598 A | 2/1999 | Tomita | |
| 5,964,266 A | 10/1999 | Boiocchi et al. | |
| 6,116,309 A | 9/2000 | Gillard et al. | |
| 6,123,130 A | 9/2000 | Himuro et al. | |
| 6,263,934 B1 * | 7/2001 | Auxerre et al. | 152/DIG. 3 |
| 6,283,184 B1 | 9/2001 | Tomita | |
| 6,378,583 B1 | 4/2002 | Fontaine | |
| 6,382,283 B1 | 5/2002 | Caretta | |
| 6,408,911 B1 | 6/2002 | Tanabe et al. | |
| 6,409,861 B1 * | 6/2002 | Yukawa | 152/209.2 |
| 6,427,737 B1 | 8/2002 | Katayama | |
| 6,668,885 B2 | 12/2003 | Ishiyama | |
| 6,695,023 B1 | 2/2004 | Saito | |
| 6,739,364 B2 | 5/2004 | Tsuda | |
| 6,834,695 B2 | 12/2004 | Tomita | |
| 6,837,285 B2 | 1/2005 | Eromaki | |

(Continued)

FOREIGN PATENT DOCUMENTS

EP  194069  * 9/1986

(Continued)

OTHER PUBLICATIONS

Machine translation for Japan 2006-321342 (no date).*

(Continued)

*Primary Examiner* — Steven D Maki

(57) ABSTRACT

A tire comprising a circumferential tread including at least one tread block having at least one edge. The tread block includes at least one void provided therein not more than about 4 millimeters from the edge of the tread block. Exemplary voids include sipes, such as one-end open sipes, two-end open sipes, and internal sipes, and cutouts, such as internal cut-outs and edge cut-outs.

3 Claims, 6 Drawing Sheets

U.S. PATENT DOCUMENTS

| | | | |
|---|---|---|---|
| 6,840,296 | B2 | 1/2005 | Suzuki et al. |
| 6,907,910 | B2 * | 6/2005 | Iwamura ................. 152/209.23 |
| 2001/0022209 | A1 | 9/2001 | Chaen et al. |
| 2003/0089439 | A1 * | 5/2003 | Thiebaud ................. 152/209.17 |
| 2005/0248053 | A1 * | 11/2005 | Hyakutake et al. ............. 425/35 |

FOREIGN PATENT DOCUMENTS

| | | | |
|---|---|---|---|
| EP | 618091 | * | 10/1994 |
| EP | 1048488 | * | 11/2000 |
| GB | 546975 | * | 8/1942 |
| JP | 60-128005 | * | 7/1985 |
| JP | 02200503 | | 8/1990 |
| JP | 04-085108 | * | 3/1992 |
| JP | 05-330318 A | | 12/1993 |
| JP | H05-330318 A | | 12/1993 |
| JP | 07-101210 | * | 4/1995 |
| JP | 07-101210 A | | 4/1995 |
| JP | H07-101210 A | | 4/1995 |
| JP | 08-318708 | * | 12/1996 |
| JP | 10-000904 | * | 1/1998 |
| JP | 1304239 | * | 4/2003 |
| JP | 2006-007793 | * | 1/2006 |
| JP | 2006-321342 | * | 11/2006 |
| JP | 2006-321342 A | | 11/2006 |

OTHER PUBLICATIONS

Machine translation for Japan 2006-007793 (no date).*
Machine translation for Japan 10-000904 (no date).*
Machine translation for Japan 08-318708 (no date).*
Machine translation for Japan 07-101210 (no date).*
Machine translation for Europe 618091 (no date).*
ISA/KR (Korean Intellectual Property Office), International Search Report and Written Opinion, Jan. 6, 2009, 12, Korean Intellectual Property Office, Seo-gu, Daejeon, Korea.
Becamel, Philippe, International Preliminary Report on Patentability and Written Opinion, Application No. PCT/US08/07096, Dec. 23, 2009, pp. 1-7, The International Bureau of WIPO, Geneva, Switzerland.
http://fourwheelre.com/techarticles/p169472_image_large.jpg; Mar. 11, 2005.
http://fourwheelre.com/techarticles/p169483_image_large.jpg; Mar. 11, 2005.

* cited by examiner

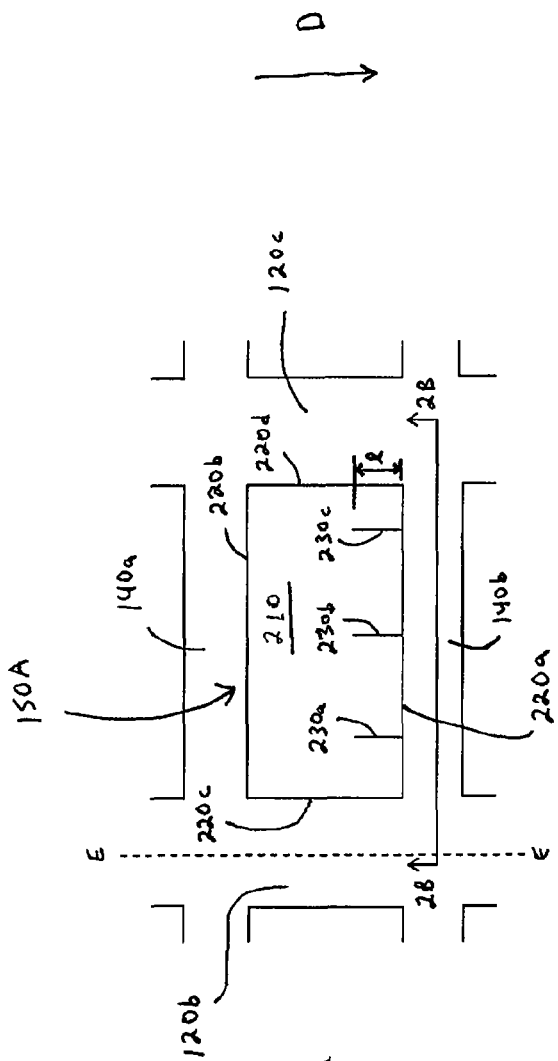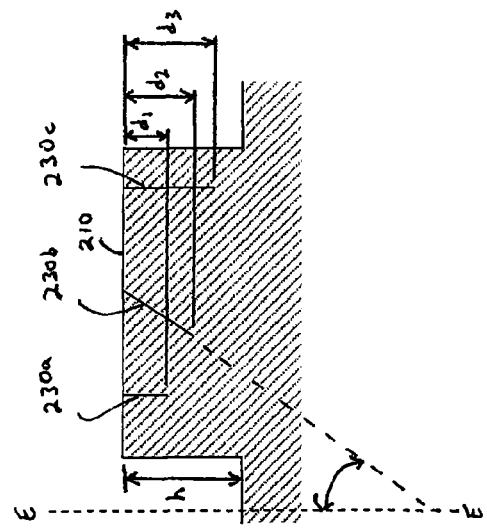
Fig. 2A
Fig. 2B

TREAD BLOCKS HAVING REDUCED EDGE STIFFNESS

FIELD OF THE INVENTION

The present application relates to tires and, more particularly, to tires that include tread blocks having a reduced edge stiffness to improve tire performance.

BACKGROUND

Tires generally have a circumferential tread pattern that includes circumferential grooves that define ribs. Sometimes, the tread patterns includes slots in the ribs that divide the ribs into tread elements referred to as blocks or lugs. Ribs and blocks may have a variety of different sizes and shapes. Tire tread patterns may have different numbers of ribs and blocks that may be distributed in the tread to form a variety of different tread patterns.

The edges of ribs and blocks generally affect the performance of a tire. For example, increased cumulative edge length generally results in improved traction of a tire on ice and snow. Edges that are rigid or stiff, however, may not provide optimal traction, may generate pattern noise as the edges contact and/or leave a road surface, and may not provide optimal handling and/or stopping distances for a vehicle.

SUMMARY

In one embodiment, a tire is provided. The tire includes a circumferential tread including at least one tread block having at least one edge. The tread block includes at least one void provided therein not more than about 4 mm from the edge of the tread block. Exemplary voids include sipes, such as one-end open sipes, two-end open sipes, and internal sipes, and cutouts, such as internal cut-outs and edge cut-outs.

In another embodiment, a circumferential tread of a tire is provided. The circumferential tread includes a plurality of tread blocks each having at least one edge, wherein at least one of the tread blocks includes at least one sipe disposed therein and positioned no more than about 4 mm from the edge of the at least one tread block. Exemplary sipes include one-end open sipes, two-end open sipes, and internal sipes.

In another embodiment, a tire is provided. The tire has a circumferential tread including a plurality of tread blocks each having a leading edge. At least one of the tread blocks includes at least three sipes disposed therein and positioned no more than about 4 mm from the leading edge of the at least one tread block. The at least three sipes include two outer sipes and at least one intermediate sipe positioned therebetween, wherein the at least one intermediate sipe has a longer length than the two outer sipes. The at least one tread block further includes an internal, non-cylindrical cut-out, wherein no cut-out is disposed more than about 4 mm from the leading edge of the at least one tread block.

BRIEF DESCRIPTION OF THE DRAWINGS

The accompanying drawings, which are incorporated in and constitute a part of the specification, illustrate various examples that, together with the detailed description given below, serve to describe some example embodiments. The drawings are for the purposes of understanding and illustrating the preferred and some alternative embodiments and are not to be construed as limitations.

Further, in the accompanying drawings and descriptions that follow, like parts or features are normally indicated throughout the drawings and description with the same reference numerals, respectively. The figures are not necessarily drawn to scale and the proportions of certain parts or features may be exaggerated for convenience of illustration. Some of the drawings have dimensions indicated therein. For example, a dimension indicated as "≦4 mm" means that the measurement may be between about 0 and about 4 millimeters.

FIG. 2A illustrates a fragmentary, plan view of one embodiment of a block 150A provided in the tread 110 of the tire 100.

FIG. 2B illustrates a side view of the block 150A having sipes 230a-c.

DETAILED DESCRIPTION

The following includes definitions of selected terms that may be used herein. The definitions include various examples and/or forms of components that fall within the scope of a term and that may be used for implementation. The examples are not intended to be limiting.

"Axial" and "axially" refer to a direction that is parallel to the axis of rotation of a tire.

"Circumferential" and "circumferentially" refer to lines or directions extending along the perimeter of the surface of the tread parallel to the equatorial plane and perpendicular to the axial direction of the tire.

"Cut-out" generally refers to voids having a greater volume than sipes. A cut-out that communicates with another void (e.g., a groove or slot) may be called an "edge cut-out." A cut-out that does not communicate with a groove or slot may be called an "internal cut-out."

"Edge," as used herein, generally refers to a part of a tread element adjacent to a void, such as a groove, slot, or sipe.

"Groove" refers to an elongated void area in the tread of the tire that extends circumferentially in a straight, curved, zig-zag, wavy, or other non-straight manner.

"Lateral" refers to a direction along the tread of the tire going from one sidewall of a tire to the other sidewall.

"Radial" and "radially" refer to a direction perpendicular to the axis of rotation of a tire.

"Sipe" refers to a thin slit formed in the surface of the tread that may extend laterally, circumferentially, or at an acute angle relative to the circumferential direction of the tire. The sipe can be straight, curved, zigzag, wavy, or take the form of any other non-straight configuration. A sipe may also be classified based on its communication with one or more edges of a tread element. For example, a sipe with one end in communication with an edge of a tread element may be called a "one-end open sipe." A sipe with two ends in communication with an edge of a tread element may be called a "both-end open sipe" or "two-end open sipe." A sipe that does not communicate with an edge of a tread element may be called an "internal sipe." A sipe can have a depth that is up to 100% of the maximum depth of a groove or slot formed in the tread.

"Slot" refers to an elongated void area in the tread of the tire that extends laterally or at an acute angle relative to the circumferential direction of the tire. The slot can be straight, curved, zigzag, wavy, or take the form of any other non-straight configuration.

"Tread" refers to that portion of the tire that comes into contact with a surface under normal load.

"Tread element" generally refers to individual features of a tread that contact a road surface, such as ribs and blocks.

"Void" or "recess" generally refers to grooves, slots, sipes, cutouts, and the like that are provided in the tread of the tire and contribute to the tread design.

Figure 1:
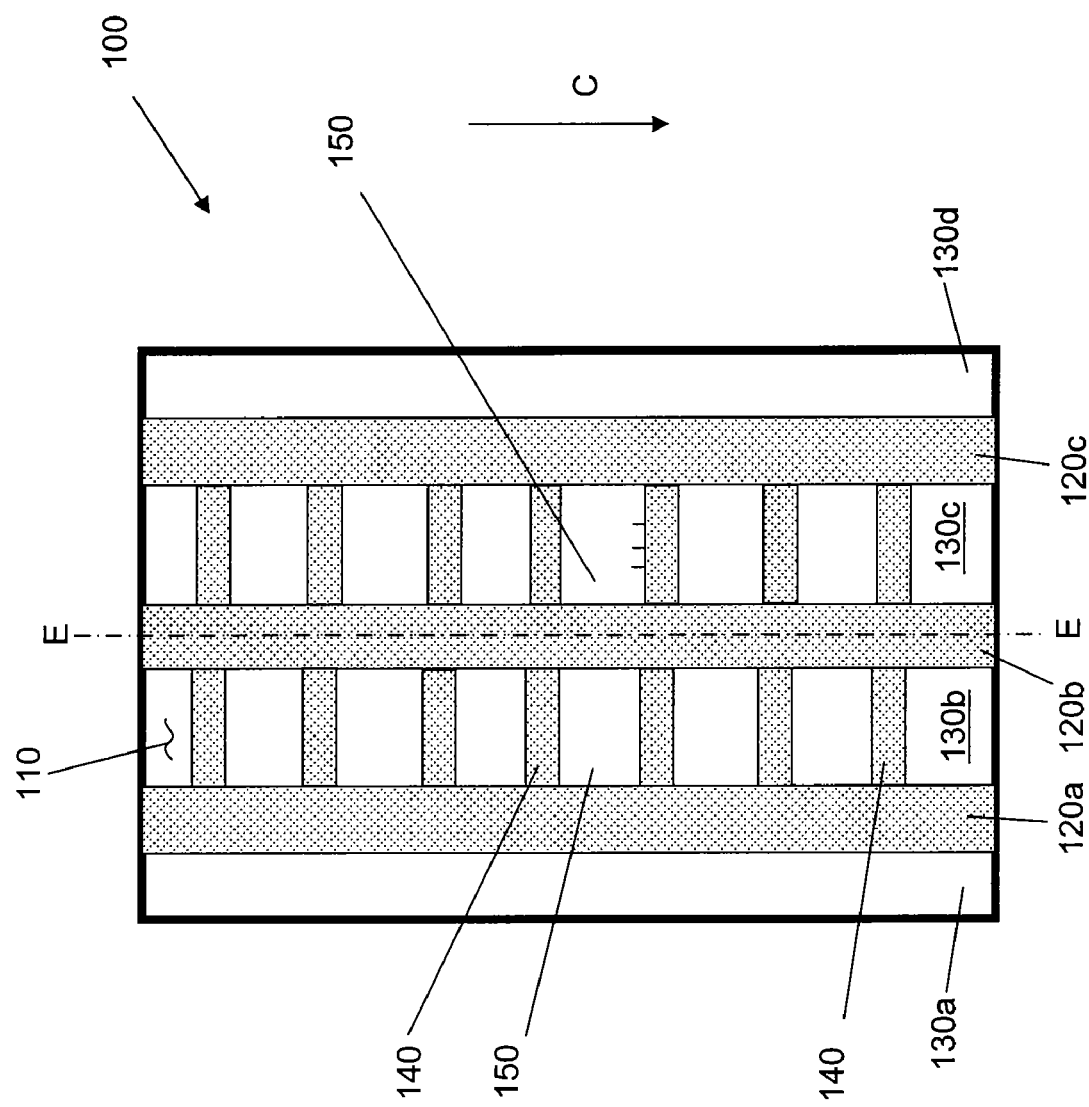
FIG. 1 illustrates a top plan view of one embodiment of a tire 100.

Illustrated in FIG. 1 is a top plan view of one embodiment of a tire 100 having a tread 110 that extends in a circumferential direction C around the tire 100. The tread 110 is defined by three grooves 120a-c that extend circumferentially around the tire 100, thereby dividing the tread 110 into axially spaced-apart ribs 130ad that extend circumferentially around the tire 100. The ribs 130 define, at least in part, the road engaging portion of the tire 100. In alternative embodiments (not shown), the tread 110 of the tire 100 can include n number of circumferential grooves and n+1 number of circumferential ribs, where n is equal to 1 or more.

In the illustrated embodiment, the tread 110 is further defined by substantially rectilinear slots 140 that divide the ribs 130b,c into circumferentially spaced-apart blocks 150. As shown in FIG. 1, the slots 140 are substantially rectilinear and oriented substantially perpendicular to the equatorial plane E of the tire 100. In alternative embodiments (not shown), one or more of the slots 140 may be oriented at an acute angle relative to an equatorial plane E of the tire 100.

With reference to FIG. 1, the blocks 150 are rectangular in shape (when viewed from the top). The blocks 150 may take the form of a variety of shapes, and the tire tread may include blocks having the same shape or different shapes. Moreover, the blocks of the tire tread may all be of the same size or may be of different sizes.

Illustrated in FIGS. 2A and 2B are a fragmentary, top plan view of one embodiment of a block 150A provided in the tread 110 of the tire 100 and a side view of the block 150A, respectively. As shown in FIG. 2A, the block 150a has a top surface 210 and edges or sides 220. More specifically, the edges 220 will be described with reference to a leading edge 220a, a trailing edge 220b, an inner edge 220c, and an outer edge 220d when the tire is rotated in the circumferential direction represented by arrow D. The leading and trailing edges 220a,b are defined by and communicate with slots 140b,a, respectively, while outer and inner edges 220c,d are defined by and communicate with grooves 120a,b, respectively.

In the illustrated embodiment, the shape of the block 150A is rectangular (when viewed from the top), thereby providing four edges (i.e., edges 220a-d). In alternative embodiments (not shown), the block 150A may be triangular, square, trapezoidal, other regular polygonal, or other complex shape. In other embodiments (not shown), the block 150A may include one or more curved edges and take the form of a circle, oval, semi-circle, or other complex shape having at least one curved edge. In this case, the block 150A may have as little as one edge (e.g., a circle).

As shown in FIG. 2A, the edges 220a,c of the block 150A are substantially rectilinear and oriented substantially perpendicular to the equatorial plane E of the tire 100, while the edges 220b,d are substantially rectilinear and oriented substantially parallel to the equatorial plane E of the tire 100. In alternative embodiments (not shown), one or both of the edges 220a,c of the block 150A can be oriented at an acute angle relative to the equatorial plane E of the tire 100, while one or both of the edges 220b,d can be oriented at an acute angle relative to the equatorial plane E of the tire 100.

In the illustrated embodiment, the block 150A has a height h measured from the top surface 210 of the block 150A to the base of the groove 120b. In one embodiment, the height h of the block 150A may be between about 1 and about 20 millimeters (mm). Of course, the height of the block 150A may be dimensioned differently in other embodiments.

With reference to FIGS. 2A and 2B, the block 150A includes several voids disposed therein. For example, the block 150A includes three sipes 230a-c that extend from the leading edge 220a of the block 150A inward towards the interior of the block 150A in a circumferential direction. In alternative embodiments (not shown), the block 150A may include less than three or more than three voids (e.g., sipes) that extend inward from the leading edge 220a of the block 150A. Moreover, in other embodiments (not shown), the block 150A may include one or more voids (e.g., sipes) that extend inward from one or more of the other edges 220b,c,d of the block 150A.

In this embodiment, the sipes 230a-c are substantially rectilinear and oriented substantially parallel relative to the circumferential direction C of the tire 100. In alternative embodiments (not shown), one or more of the sipes 230a-c may be oriented at an acute angle relative to the circumferential direction C of the tire 100.

In one embodiment, the sipes 230a-c can be positioned within the block 150A no more than about 4 mm from the leading edge 220a of the block 150A. For example, as shown in FIG. 2A, the sipes 230a-c can extend inward from the leading edge 220a of the block 150A at a length l that is less than about 4 mm. Although FIG. 2A illustrates that all three sipes 230a-c extend inward from the leading edge 220a of the block 150A the same length l, one or both of the sipes 230a-c extend inward at different lengths that are less than about 4 mm. In alternative embodiments (not shown), one or more of the sipes 230a-c can extend inward from the leading edge 220a of the block 150A more than 4 mm, depending on the design of the tread block.

With reference to FIG. 2B, the sipes 230a-c extend into the block at various depths. For example, the sipes 230a-c extend into the block 150A at depths d1-d3, respectively, measured from the top surface 210 of the block 150A. In one embodiment, the depths of the sipes 230a-c may be between about 10% and about 100% of the height h of the block 150A. Of course, the depths of the sipes 230a-c may be dimensioned differently in other embodiments. Although FIG. 2B illustrates that the three sipes 230a-c have different depths, two or more of the sipes 230a-c can have the same depths.

As shown in FIG. 2B, the sipes 230a-c extend into the block 150A at various angles relative to the equatorial plane E of the tire 100. Specifically, the sipes 230a,c are oriented substantially parallel relative to the equatorial plane E of the tire 100, while the sipe 230b is oriented at an acute angle relative to the equatorial plane E of the tire 100. In alternative embodiments (not shown), two or more of the sipes 230a-c may be oriented at an acute angle relative to the equatorial plane E of the tire 100.

In the illustrated embodiment, the sipes 230a-c in the block 150A are one-end open sipes. In alternative embodiments (not shown), one or more of the sipes 230a-c may be two-end open sipes.

Figure 3:
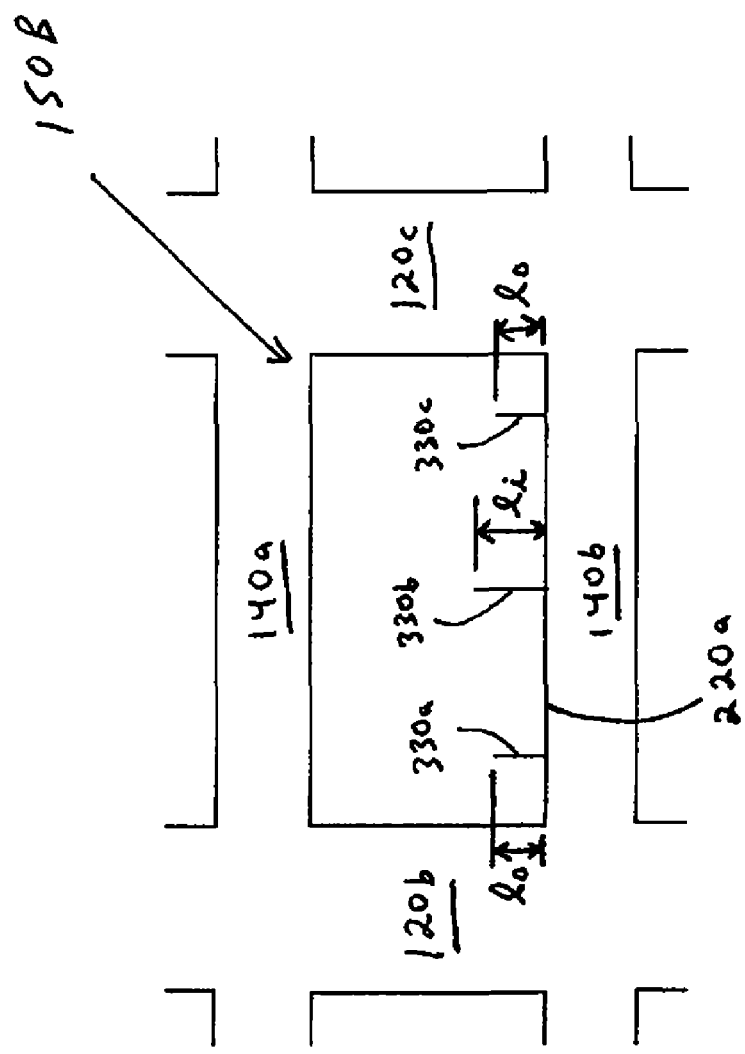
FIG. 3 illustrates a fragmentary, plan view of another embodiment of a block 150B having sipes 330a-c of various lengths.

Illustrated in FIG. 3 is a fragmentary, top plan view of another embodiment of a block 150B having voids of various lengths. Specifically, the block 150B includes three sipes 330a-c that extend from the leading edge 220a of the block 150B inward towards the interior of the block 150B in a circumferential direction. In alternative embodiments (not shown), the block 150B may include less than three or more than three voids (e.g., sipes) that extend inward from the leading edge 220a of the block 150B. Moreover, in other embodiments (not shown), the block 150B may include one or more voids (e.g., sipes) that extend inward from one or more of the other edges 220b,c,d of the block 150B.

In this embodiment, the sipes 330a-c are substantially rectilinear and oriented substantially parallel relative to the circumferential direction C of the tire. In alternative embodiments (not shown), one or more of the sipes 330a-c may be oriented at an acute angle relative to the circumferential direction C of the tire.

In the illustrated embodiment, the sipes 330a-c have different lengths. Specifically, as shown in FIG. 3, the length $l_o$ of the outer sipes 330a,c (which are adjacent to the inner and outer side edges 220c,d, respectively) is less than the length $l_i$ of the intermediate sipe 330b. In other words, the sipes 330a-c have alternating lengths. In alternative embodiments (not shown) where there are more than three voids (e.g., sipes) extending from the leading edge 220a of the block, the voids (e.g., sipes) can alternate in length. In alternative embodiments (not shown) where there are more than three voids (e.g., sipes) extending from the leading edge 220a of the block, the voids (e.g., sipes) adjacent to the side edges 220c,d of the block are shorter than the voids in between them. In other words, if there are four sipes extending from the leading edge of the block, the two outer sipes can be one length and the other two sipes disposed between the outer two sipes can be a second length that is longer than the first length.

In one embodiment, the sipes 330a-c can be positioned within the block 150B no more than about 4 mm from the leading edge 220a of the block 150B. For example, the sipes 330a-c can extend inward from the leading edge 220a of the block 150B at a length that is less than about 4 mm. In alternative embodiments (not shown), one or more of the sipes 330a-c can extend inward from the leading edge 220a of the block 150B more than 4 mm, depending on the design of the tread block.

Figure 4:
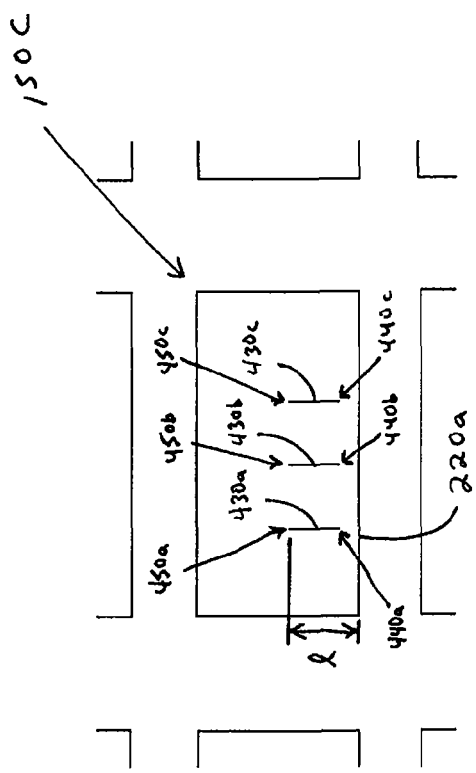
FIG. 4 illustrates a fragmentary, plan view of another embodiment of a block 150C having internal sipes 430a-c.

Illustrated in FIG. 4 is a fragmentary, top plan view of another embodiment of a block 150C having voids spaced from the leading edge 220a of the block 150C. Specifically, the block 150C includes three internal sipes 430a-c that are spaced from the leading edge 220a. Each sipe 430a-c has an outer end 440a-c that is spaced from the leading edge 220a and an inner end 450a-c. In alternative embodiments (not shown), the block 150C may include less than three or more than three voids (e.g., internal sipes) that are spaced from the leading edge 220a of the block 150C. Additionally, in other embodiments (not shown), the block 150C may include one or more voids (e.g., internal sipes) that are spaced from one or more of the other edges of the block 150C. Moreover, in other embodiments (not shown), the block 150C may include one or more voids (e.g., internal sipes) that are spaced from one or more of the other edges of the block 150C, and one or more voids (e.g., internal sipes) that extend from one or more of the other edges of the block 150C.

Each of the internal sipes 430a-c are substantially rectilinear and oriented substantially parallel to the circumferential direction C of the tire. However, in alternative embodiments (not shown), one or more of the internal sipes 430a-c may be oriented at an acute angle or substantially perpendicular relative to the circumferential direction C of the tire.

In the illustrated embodiment of FIG. 4, the internal sipes 430a-c are spaced from the block 150C at a length l measured from the leading edge 220a of the block 150C to the inner ends 340a-c of the internal sipes 430a-c. Although FIG. 3 illustrates that all three sipes 430a-c are spaced from the leading edge 220a of the block 150C the same length 1, the sipes 430a-c can be spaced from the leading edge 220a of the block 150C at different lengths. In one embodiment, the internal sipes 430a-c are positioned within the block 150C such that the length l is less than about 4 mm. In alternative embodiments (not shown), one or more of the sipes 330a-c can be spaced from the leading edge 220a of the block 150C more than 4 mm depending on the design of the tread block.

The internal sipes 430a-c also can vary in depth as discussed above. In one embodiment, the depths of the sipes 430a-c may be between about 10% and about 100% of the height h of the block 150C. Of course, the depths of the sipes 430a-c may be dimensioned differently in other embodiments.

Figure 5:
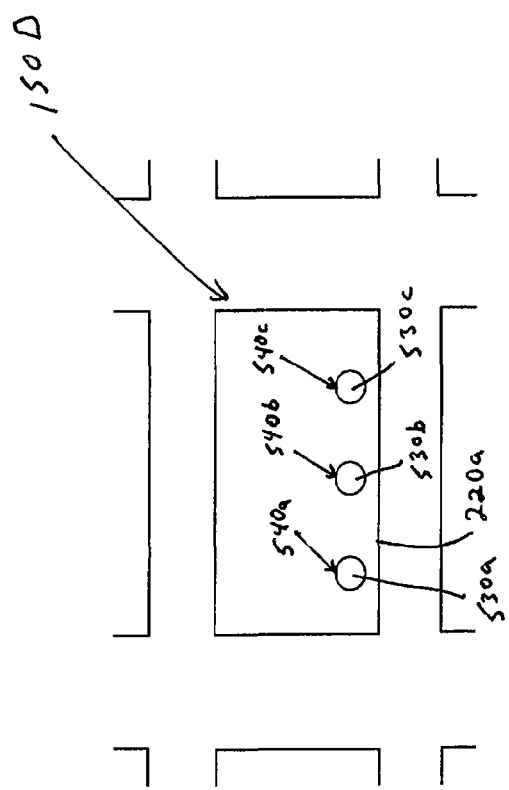
FIG. 5 illustrates a fragmentary, plan view of another embodiment of a block 150D having internal cut-outs 530a-c.

Illustrated in FIG. 5 is a fragmentary, top plan view of another embodiment of a block 150D having voids spaced from the leading edge 220a of the block 150D. Specifically, the block 150D has three internal cut-outs 530a-c spaced from the leading edge 220a of the block 150D. In alternative embodiments (not shown), the block 150D may include less than three or more than three voids (e.g., internal cut-outs) that are spaced from the leading edge 220a of the block 150D. Moreover, in other embodiments (not shown), the block 150D may include one or more voids (e.g., internal cut-outs) that are spaced from one or more of the other edges of the block 150D.

In the illustrated embodiment, the shape of each internal cut-out 530a-c is circular (when viewed from the top), thereby providing a cylindrical cut-out. In alternative embodiments (not shown), one or more of the internal cut-outs 530a-c may be triangular, square, rectangular, trapezoidal, regular polygonal, or another complex shape (when viewed from the top).

In the illustrated embodiment of FIG. 5, the internal cut-outs 530a-c are spaced from the block 150D at a length l measured from the leading edge 220a of the block 150D to the inner most portions 540a-c of the internal cut-outs 530a-c. Although FIG. 4 illustrates that all three internal cut-outs 530a-c are spaced from the leading edge 220a of the block 150D the same length l, the internal cut-outs 530a-c can be spaced from the leading edge 220a of the block 150D at different lengths. In one embodiment, the internal cut-outs 430a-c are positioned within the block 150D such that the length l is less than about 4 mm. In alternative embodiments (not shown), one or more of the internal cut-outs 530a-c can be spaced from the leading edge 220a of the block 150D more than 4 mm depending on the design of the tread block.

The internal cut-outs 430a-c also can have various depths. In one embodiment, the depths of the internal cut-outs 530a-c may be between about 10% and about 100% of the height h of the block 150D. Of course, the depths of the internal cut-outs 530a-c may be dimensioned differently in other embodiments.

Figure 6:
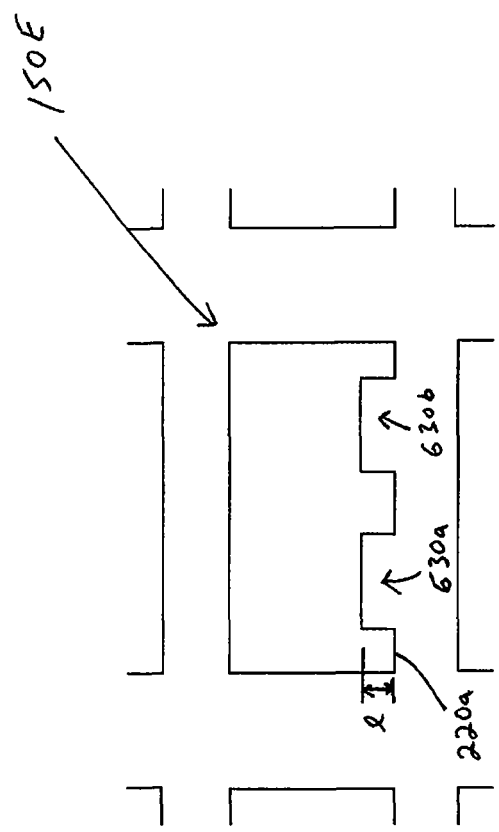
FIG. 6 illustrates a fragmentary, plan view of another embodiment of a block 150E having rectangular-shaped edge cut-outs 630a-c.

Illustrated in FIG. 6 is a fragmentary, top plan view of another embodiment of a block 150E having voids that extend inward from the leading edge 220a of the block 150E. For example, the block 150E has two edge cut-outs 630a-b spaced from the leading edge 220a of the block 150E. In alternative embodiments (not shown), the block 150E may include less than two or more than three voids (e.g., edge cut-outs, internal cut-outs, and/or sipes) that extend from the leading edge 220a of the block 150E. Moreover, in other embodiments (not shown), the block 150E may include one or more voids (e.g., edge cut-outs, internal cut-outs, and/or sipes) that extend from one or more of the other edges of the block 150E.

In one embodiment, the edge cut-outs 630a-b are positioned within the block 150E no more than about 4 mm from the leading edge 220a of the block 150E. For example, as shown in FIG. 5, the edge cut-outs 630a-b can extend inward from the leading edge 220a of the block 150E at a length l that is less than about 4 mm. Although FIG. 5 illustrates that both edge cut-outs 630a-b extend inward from the leading edge 220a of the block 150E the same length l, the edge cut-outs 630a-b can extend inward at different lengths that are less than about 4 mm. In alternative embodiments (not shown), one or more of the edge cut-outs 630a-b can extend inward from the leading edge 220a of the block 150E more than 4 mm depending on the design of the tread block.

As discussed above, the edge cut-outs 630a-b also can have various depths. In one embodiment, the depths of the edge cut-outs 630a-b may be between about 10% and about 100% of the height h of the block 150E. Of course, the depths of the edge cut-outs 530a-b may be dimensioned differently in other embodiments.

In the illustrated embodiment, the shape of each edge cut-out 630a-b is rectangular (when viewed from the top). In alternative embodiments, one or more of the edge cut-outs may take the form of another shape.

Figure 7:
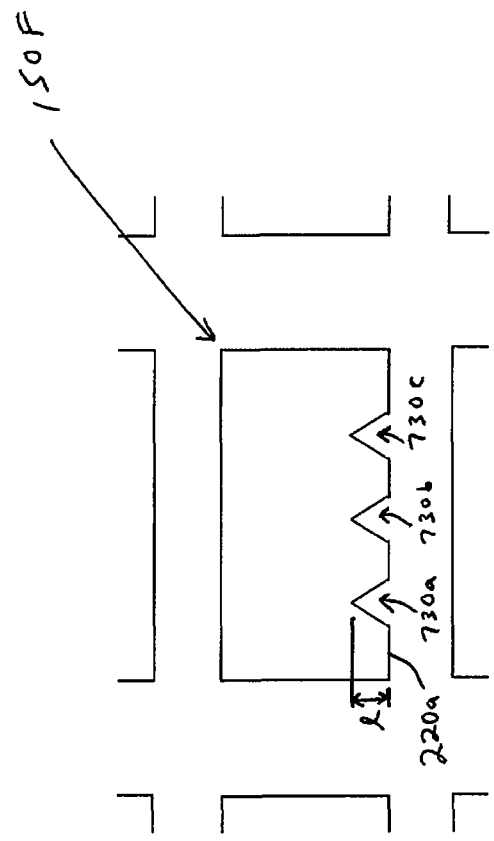
FIG. 7 illustrates a fragmentary, plan view of another embodiment of a block 15OF having triangular-shaped edge cut-outs 730a-c.
Figure 8:
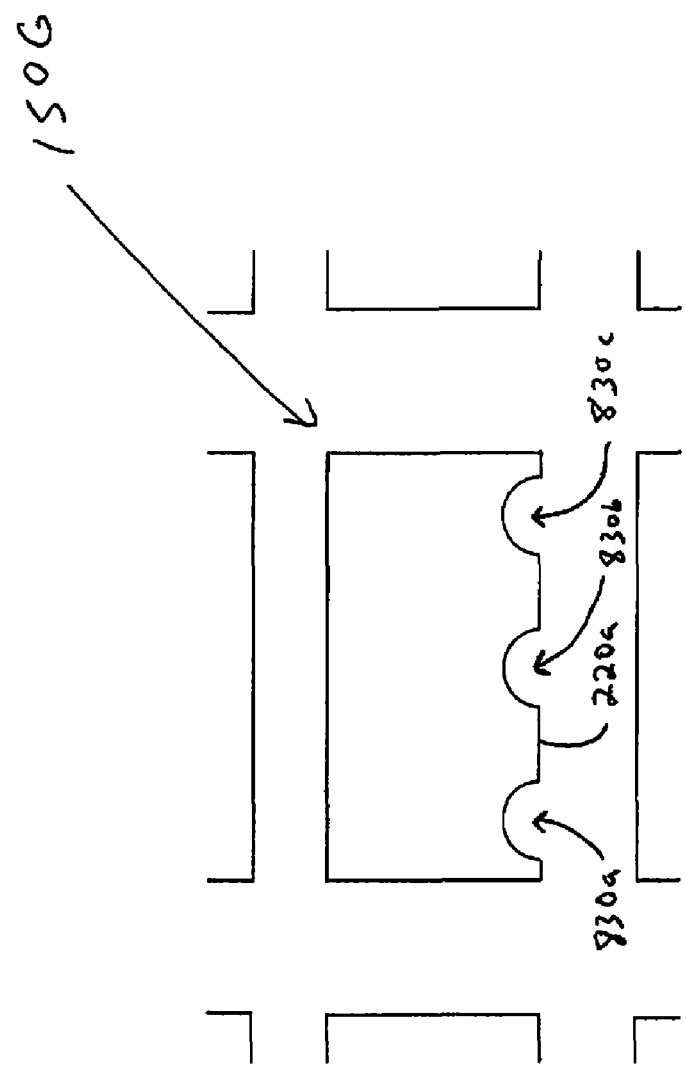
FIG. 8 illustrates a fragmentary, plan view of another embodiment of a block 150G having semi-circular shaped edge cut-outs 830a-c.

For example, FIG. 7 illustrates a fragmentary, top plan view of a block 150E having triangular shaped edge cut-outs 730a-c that extend inward from the leading edge 220a of the block 150F. In another example, FIG. 8 illustrates a fragmentary, top plan view of a block 150G having semi-circular shaped edge cut-outs 830a-c that extend inward from the leading edge 220a of the block 150G. In alternative embodiments (not shown), the edge cut-outs may be square, trapezoidal, regular polygonal, or another complex shape (when viewed from the top). In these examples, it is preferred that the edge cut-outs are positioned within the tread blocks no more than about 4 mm from the edge of the trade block.

Although the tread elements discussed above and shown in the figures include only tread blocks, it is contemplated that the voids can be provided in other tread elements such as ribs. Furthermore, although the figures illustrate only one type of void provided at or near (within 4 mm) the edge of the tread element, it is possible to provide different types of voids (e.g., sipes and cut-outs) in any combination at or near one or more of the edges.

The tire treads discussed above are not limited to the embodiments discussed above and illustrated in the figures. The tread of the tire may be configured in any desired tread design or pattern without departing from the scope of this application. For example, one or more grooves and/or one or more ribs can have a substantially constant or uniform cross-section around the circumference of the tire. Alternatively, one or more grooves and/or one or more ribs can have a variable cross-section that extends around the circumference of the tire. Additionally, both edge portions of the grooves and/or both edge portions of the ribs can be symmetrical or asymmetrical. Furthermore, the ribs and/or blocks may include any combination of sipes, slots, etc. to form a wide variety of desired tread patterns.

By providing voids at or near the edge (i.e., within 4 mm) of a tread block, the rigidity or stiffness of the tread block can be reduced near its edge, without affecting (or minimally affecting) the rigidity of the interior of the tread block or the region of the tread block that is not near its edge. A reduction in rigidity of a tread block near its edges produces "softer" edges, thereby improving tire tread traction on ice and snow covered surfaces, decreasing tire tread pattern noise, and may improve wet traction. Specifically, with respect to the addition of internal cut-outs within 4 mm of the edge of a tread element, the internal cut-outs allow for compression of the respective edge of the tread element, thereby permitting the internal cut-out to hold the ice or snow in place.

The tires and tire treads described above and illustrated in FIGS. 1-8 can be produced in a variety of ways. One exemplary production method includes the use of a tire vulcanization mold. The mold includes tread-imparting structure configured to form a tread into a green tire.

To impart tread elements with a chamfered edge described above (e.g., voids 230, 330, 430, 530, 630, 730, 830) into the tire tread, the tread-imparting structure includes specific structure that corresponds to the shape and dimensions of the voids described above. For example, the tread-imparting structure includes one or more void-forming elements that extend from a base surface.

To produce the tire in the mold, a green tire is first placed in the mold. To support the green tire during the molding process, a high temperature and high pressure medium is charged into a bladder (not shown). As the mold is collapsed around the green tire, the tread-imparting structure is forced into the green tire, thereby forming the tire tread. In this manner, the voids are formed in the outer surface of the tire tread.

To the extent that the term "includes" or "including" is used in the specification or the claims, it is intended to be inclusive in a manner similar to the term "comprising " as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2 d. Ed. 1995). Also, to the extent that the terms "in" or "into" are used in the specification or the claims, it is intended to additionally mean "on" or "onto."

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:
1. A tire comprising:
a circumferential tread including a plurality of tread blocks each having a leading edge,
wherein at least one of the tread blocks includes at least three sipes disposed therein and positioned no more than about 4 mm from the leading edge of the at least one tread block, wherein the at least three sipes include two outer sipes and at least one intermediate sipe positioned therebetween, wherein the at least one intermediate sipe has a longer length than the two outer sipes, wherein the at least one tread block further includes an internal, non-cylindrical cut-out, and wherein no cut-out is disposed more than about 4 mm from the leading edge of the at least one tread block.

2. The tire of claim 1, wherein the two outer sipes have the same length.

3. The tire of claim 1, having more than three sipes, wherein the sipes have alternating lengths.

* * * * *